United States Patent [19]

Janecke et al.

[11] Patent Number: 4,576,200

[45] Date of Patent: Mar. 18, 1986

[54] HYDRAULIC PRESSURE REDUCING CONTROL VALVE

[75] Inventors: James P. Janecke, Waukesha; Kishor J. Patel, Mukwonago, both of Wis.

[73] Assignee: Applied Power Inc., Milwaukee, Wis.

[21] Appl. No.: 716,037

[22] Filed: Mar. 26, 1985

[51] Int. Cl.⁴ ............................................. G05D 16/00
[52] U.S. Cl. ........................... 137/624.13; 137/625.64; 137/625.66; 137/625.69
[58] Field of Search .................. 137/85, 625.6, 625.64, 137/625.69, 625.66, 624.13, 116.3, 116.5

[56] References Cited

U.S. PATENT DOCUMENTS

| | | | |
|---|---|---|---|
| 3,454,026 | 7/1969 | Orme | 137/625.64 X |
| 3,592,211 | 7/1971 | Spalding | 137/625.64 X |
| 3,802,453 | 4/1974 | Fleury | 137/85 |
| 3,856,047 | 12/1974 | Takayama | 137/625.64 X |
| 3,990,352 | 11/1976 | Nisheda | 137/625.69 X |
| 4,524,804 | 6/1985 | Goedecke | 137/625.64 |

Primary Examiner—Alan Cohan

[57] ABSTRACT

A hydraulic pressure control valve includes a spool which has a first end having a first cross-sectional area. The opposite end of the spool has a reduced cross-sectional area. Modulated pressure is provided to a chamber at the first end of the spool and when it increases beyond the force of a biasing spring, an inlet port is connected to an outlet port. Feedback pressure acts on the differential area between a full cross-sectional area of the spool and a reduced area portion of the spool located within the outlet port. The feedback force on the spool is in proportion to the changing control force. A sleeve is provided at the end of the valve adjacent the reduced area portion of the spool, such portion and sleeve cooperating to provide a sliding seal. The outlet port will be coupled to tank whenever the modulated pressure falls below the combination of the spring force and the feedback pressure.

11 Claims, 3 Drawing Figures

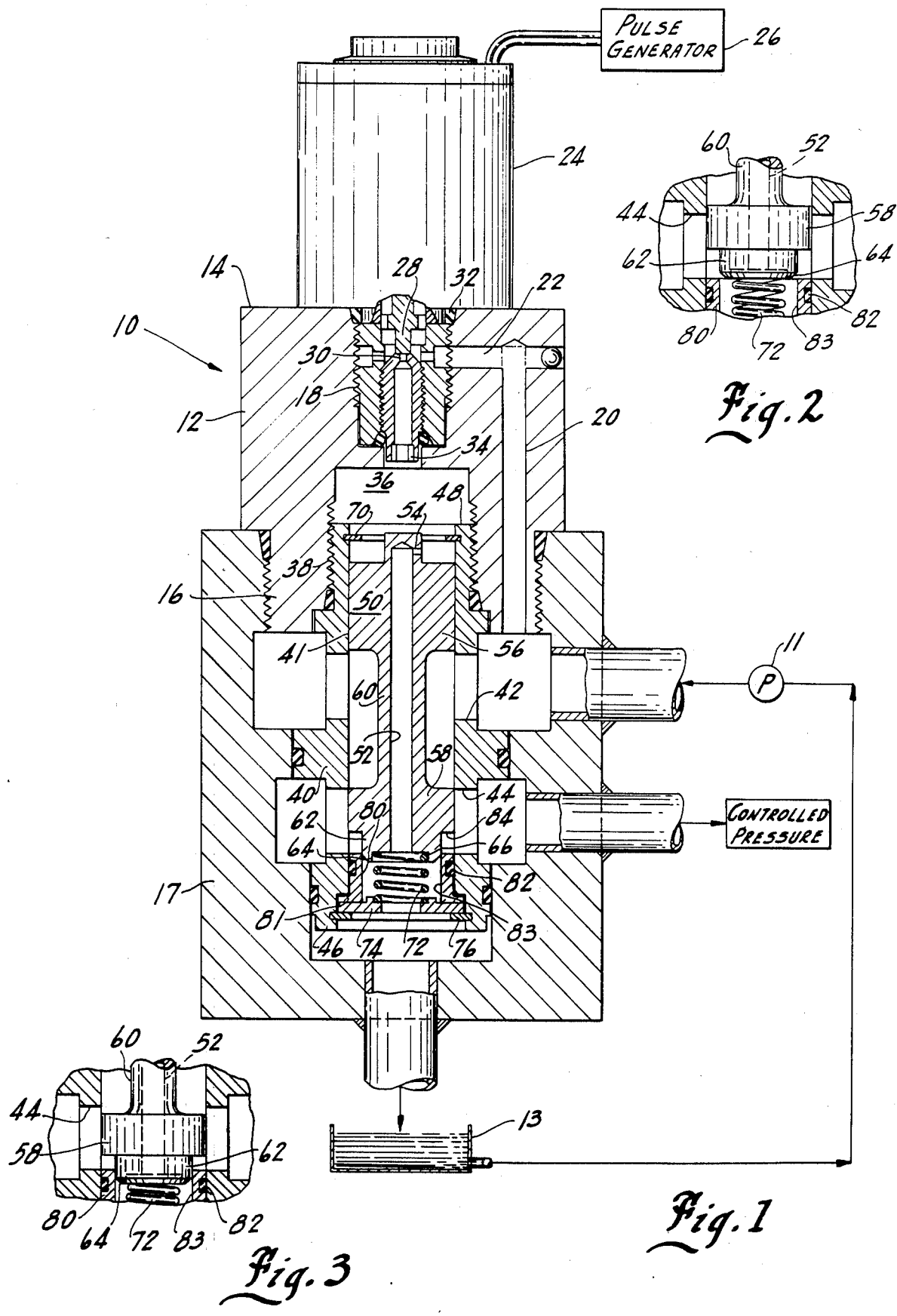

HYDRAULIC PRESSURE REDUCING CONTROL VALVE

BACKGROUND OF THE INVENTION

1. Field of the Invention

The present invention relates generally to the art of hydraulic pressure control valves. More specifically, the present invention relates to a hydraulic modulated pressure control valve in which inlet and outlet pressures can be matched at full modulation and which includes a failsafe system to connect the valve outlet to tank in the event of a malfunction of the modulator or loss of pump pressure.

2. Description of the Prior Art

Pressure control valves of many different types are known to the art. Hydraulic pressure control valves are known which are capable of limiting outlet pressure with respect to inlet pressure and which include a means for sensing feedback pressure from the outlet side. Typically, the feedback sensing means is a valve spool area connected to the outlet pressure that is opposed by a bias spring which holds the valve spool in an open position. When the outlet feedback pressure equals the spring pressure, a pressure control level is established. Prior art devices usually provide for manual adjustment of the outlet pressure by adjustment of the biasing spring to increase or decrease the outlet pressure. These typical prior art valves have proven to be suitable for light industrial applications, but they are not satisfactory for mobile applications, such as changing, over a short time span, the controlling pressure for engaging clutches of tractors or other off-highway vehicles. Manual spring adjustment is not practical in such applications.

In addition to the above-mentioned types of pressure control valves, other pressure control valves are known to the art. For example, an electro-hydraulic driven pressure reducing valve is shown in Orme's U.S. Pat. No. 3,454,026 issued July 8, 1969 for "Pressure Feedback." The valve of this patent includes a central land on a valve spool to control the valve outlet pressure. The valve also includes a first stage servo valve to control the pressure of the incoming fluid and that going out the outlet port and two separate control chambers at each end of the servo valve spool. The valve spool is nulled by a combination of four centering springs. Second and third lands are provided at each end of the spool to isolate the various fluid pressures acting upon the valve. These second and third lands are of a reduced diameter. A passage is provided in the spool to connect the outlet to a chamber at one end of the spool to provide a feedback which in turn regulates the outlet pressure.

Another "Pressure-Regulating Valve" is shown in Spalding's U.S. Pat. No. 3,592,211 issued July 13, 1971. It employs a single control passage and a single control chamber which is driven by a first stage servo to control the fluid pressure in a second stage. A separate compensating piston is provided to keep the spool open to tank when the first stage is not driven by the second stage. The piston, of course, requires pressure to hold the spool in a biased position and leakage or contamination can cause a malfunction thereof. Differential area feedback is employed in this valve through the use of another piston acting against the spool. This combination necessitates pressure passages between the piston and the outlet port and a separate spool land between the tank and the end of the spool on which the piston acts.

Another servo-valve is described in U.S. Pat. No. 3,802,453 issued to Fleury on Apr. 9, 1974 for "Servo-Valve Responsive to Small Control Pressure." The valve includes a spool valve controlling the main pressure, one end of which is subjected to a control pressure and the other end of which is subjected to a feedback pressure. The latter is derived from the output pressure and is diminished by a resilient counter-pressure. A low force input is placed on the spool and a high feedback pressure acts on a piston against a large spring. As the piston moves it creates an increasing load on a small spring which creates a feedback force equal to the input force. The amount of feedback force is fixed. The Fleury valve also has a land between the tank and the spool end on which the feedback spring acts.

Yet another prior art valve is shown in U.S. Pat. No. 3,856,047 issued to Takayama on Dec. 24, 1974 for "Pressure Control Valve." A spool is mounted in a housing for selectively controlling the connection between inlet and outlet ports. The spool is spring biased toward the inlet port. It includes a control chamber on the feedback side of the spool in which the inlet pressure is supplied through an orifice and then connected with another orifice, in series, but between the control chamber and the outlet port. The control pressure is higher than the outlet pressure because at acts on the full diameter of the spool end. This higher ratio feedback is a varying proportion of the outlet pressure and is proportioned to the area of the control nozzle created by the proportional solenoid. An isolating land is provided between the tank and the feedback chamber.

In addition to the aforementioned patents dealing with pressure control valves, it is known in the hydraulics art that a chamber can be connected to an inlet and that the pressure of the fluid admitted to the chamber from the inlet can be controlled or modulated. Regulation of the flow from inlet, through an orifice, to the chamber can be metered in a variety of ways. For example, a regulating means, such as a plunger, can be provided adjacent to an orifice to move in a timed relationship in response to a series of pulse signals for changing the effective flow across the orifice. In such devices, the pressure in the chamber varies with the integral of the pulses over time. A pressure regulator employing this principal is disclosed in co-pending, commonly assigned U.S. patent application, Ser. No. 06/502,699 filed June 9, 1983, now abandoned by Dale A. Knutson. The disclosure of that application is expressly incorporated herein by this reference. In the preferred embodiment of that application, the regulating means includes a solenoid activated plunger movable between first and second spaced-apart positions relative to the orifice in timed relation to each of a series of pulse signals. The frequency or width of the pulse signals may be varied to precisely control the pressure of the fluid in the chamber. To the knowledge of the present inventors, such pulse width modulated flow regulators have not been used with the type of pressure control valve to which the present invention relates.

While the aforementioned patents describe a variety of pressure control valves, they all suffer from one or more significant drawbacks. For example, pistons can malfunction due to leakage or contamination. Extra lands are required for isolation of certain pressures. A plurality of springs are required to center spools and malfunction thereof can cause valve failures. Moreover, the valves described above are relatively complex and expensive to manufacture. A pressure reducing control valve which overcomes the above-noted disadvantages of the prior art would represent a significant advance in the art. The advance would be even more significant if the resulting valve were of a simpler and safer design.

OBJECTS AND SUMMARY OF THE INVENTION

It is a principal object of the present invention to provide a pressure reducing control valve which overcomes the above-noted disadvantages of prior art control valves.

Another object of the present invention is to provide a pressure reducing control valve which is capable of matching outlet pressure to inlet pressure at full modulation.

A further object of the present invention is to provide a pressure reducing control valve having a single biasing spring to connect the valve outlet to tank in the event the modulator is not functioning.

Yet another object of the present invention is to provide a pressure reducing control valve which employs only a single modulator and in which feedback pressure acts directly on the spool within the outlet port chamber, thus eliminating the need for separate pressure passages or a separate land at the end of the spool to isolate feedback pressure from other pressures.

A still further object of the present invention is to provide means for relieving flow from the outlet port to tank, such means being a feedback land within the outlet port so that the end of the spool can be connected directly to tank.

How these and other objects of the present invention are accomplished will be described in the following description of the preferred embodiment of the invention, taken in conjunction with the drawing. Generally, however, the objects are accomplished by providing a valve which includes a sleeve having a bore therein. A spool is axially movable within the bore and includes a land having two different diameters. The full bore diameter land couples the pressure inlet port to the pressure outlet port and a reduced diameter portion of the spool land couples the outlet port to tank. The latter is made possible by providing a second sleeve within the bore adjacent one end of the valve. The outer surface of the reduced diameter portion forms a sliding seal with the inner bore of its second sleeve when these components are engaged. The shorter the engagement of the reduced diameter portion, the greater the amount of leakage to tank. This keeps the outlet pressure in a modulated state. When they move apart an annular flow path couples the outlet port to tank. In the preferred embodiment, the inlet port is also coupled by a passage to a modulator, such as the pulse width modulator described above. The modulator is coupled to and controls the pressure on a first end of the spool remote from the reduced diameter land near the spool's opposite end. A spring engages the said opposite end of the spool so that the spool is biased to a position which opens the outlet to tank when no modulated control pressure is provided to the valve. When a low, pre-determined modulated control pressure does exist, the full bore area of the spool is acted upon to move the spool against the force of the biasing spring to couple the inlet port to the outlet port. Once pressure is supplied to the outlet port, that pressure acts upon the reduced area of the lower land, providing a changing feedback force on the spool which is in direct proportion to the changing modulated pressure. Once the control pressure is decreased by the modulator until the feedback pressure equals the tank, the spring again takes over and urges the spool upwardly into the control pressure chamber and opens an annular flow path between the second sleeve and the lower end of the spool. In the preferred embodiment a return path is provided from the modulator control chamber to the tank. The path is an axial passage in the spool connected to the control pressure chamber by an orifice. Other ways in which the objects of the invention are accomplished will become apparent to those skilled in the art after the remainder of the specification is read and understood.

DESCRIPTION OF THE DRAWING

FIG. 1 is a side elevation, partially in section, of a hydraulic pressure control valve according to the preferred embodiment of the present invention;

FIG. 2 is an exploded view of a portion of the valve shown in FIG. 1, with the reduced diameter portion disposed above the second sleeve;

FIG. 3 is an exploded view of a portion of the valve shown in FIG. 1, with the reduced diameter portion in a sliding seal position with the second sleeve.

DETAILED DESCRIPTION OF THE PREFERRED EMBODIMENT

Referring now to FIG. 1, a pressure reducing valve 10 according to the preferred embodiment of the present invention is shown. In the description of the use of the illustrated embodiment, reference will be made to using valve 10 to actuate a vehicle clutch (not shown), but it should be understood at the outset that the pressure control valve of the present invention can be employed for a variety of other applications where precise control of hydraulic fluid outlet pressure is required. Moreover, while valve 10 is illustrated in a cartridge form, the valve could be variously configured by the designor for particular applications after the present specification has been read and understood. Furthermore, valve 10 and its various components can be prepared from a variety of materials known to the hydraulics art. Of course, the components selected should be capable of withstanding the highest pressures expected within valve 10.

Valve 10 also has associated with it normal pump 11 and tank components 13. These are not illustrated in detail because, in and of themselves, they do not form part of the present invention.

Valve 10 includes a cylindrical body member 12 having an upper portion 14 of a first diameter and a lower portion 16 of a slightly smaller diameter which may be threaded into a valve receptacle 17. An axial and threaded bore 18 is provided at the top of portion 14. A fluid passageway 20 extends upwardly through portion 16 to a location generally near but below the top of portion 14. A horizontal connecting passageway 22 couples the top of passageway 20 to bore 18.

A flow modulator 24 is disposed on top of body member 12, and in the preferred embodiment it is coupled to a pulse generator 26. While many types of modulators known to the hydraulic art may be used in the present invention, the preferred modulator is the pulse width modulator described in the aforementioned Knutson patent application. Modulator 24 would therefore include a solenoid (not shown) actuated by the pulse generator 26 to periodically move a plunger 28 toward and away from an orifice 30 to vary the flow therebetween and admit the desired pressure of hydraulic fluid from passageway 22 into the interior of valve 10. It will be appreciated then that bore 18 receives the plunger and orifice components of the modulator system. Such components are secured by threads and sealed to bore 18, such as by o-ring 32.

Located below bore 18 is a short axial passageway 34 which opens into an expanded cylindrical chamber 36 at the lower end of portion 14 of body 12 and extending into the top of portion 16. A second threaded axial bore 38 is provided in the portions 14 and 16 of body 12. Bore 38 receives a valve sleeve 40 which extended downwardly from body 12. Sleeve 40 is secured and sealed to body 12 in any suitable manner. Sleeve 40 includes an opening 42 to permit hydraulic fluid to be admitted therethrough from the pump 11 and an opening 44 to allow hydraulic fluid to be passed therefrom to the device to be controlled by valve 10. The bottom 46 of sleeve 40 is open to tank 13 and the top 48 of sleeve 40 is open to chamber 36.

Disposed within the bore 41 of sleeve 40 is a valve spool 50 which includes an axial passageway 52 throughout its length. Passageway 52 is open to tank 13 at its lower end and is open to chamber 36 at its upper end through a small orifice 54. Passageway 52 then provides a return path from chamber 36 to tank.

Spool 50 also includes a first land 56 located near its upper end and a second land 58 located near but spaced above its lower end. A restricted diameter portion 60 of spool 50 is located between these two lands. Furthermore, an extension 62 of spool 50 is located below land 58, the extention having a diameter less than that of bore 41. Extention 62 includes a lower conically shaped surface 64 around its lower end and an axial disc shaped recess 66 at its bottom, recess 66 surrounding the lower end of passageway 52.

From this description, it will be apparent to those skilled in the art that land 56 of spool 50 will isolate incoming pump pressure from the pressure within chamber 36 and that land 58 will isolate pump pressure from the outlet when the spool 50 is in its illustrated position or higher within sleeve 40. It should furthermore be apparent that when the spool 50 is lowered from its illustrated position, pump inlet pressure is coupled directly to the outlet opening 44 to allow for flow to the controlled device.

Referring further to FIG. 1, a snap ring 70 is disposed near the top of sleeve 40 which serves as a stop on upward movement of spool 50. Spool 50 is biased in an upward direction by a spring 72 located at the lower end of valve 10. Spring 72 is held in place between a washer 74 and recess 66, the washer 74 in turn being secured to sleeve 40 by a snap ring 76.

The final component of valve 10 is a second sleeve 80 which is a cylindrical metal member having an outside diameter just slightly less than the diameter of bore 41 and an inner bore 83 having a diameter greater than that of the reduced diameter portion 62 of spool 50. An o-ring 82 is disposed in a annular recess in the outer surface of second sleeve 80. A shoulder 81 on second sleeve 80 retains that member between washer 74 and the lower end of sleeve 40.

Now that the construction of valve 10 has been described, the operation of the valve can be explained. For purposes of this explanation, it will be assumed that valve 10 is employed to control a hydraulic actuator for an off-road vehicle clutch, such as a tractor clutch.

Valve 10 is used in this application to provide flow on demand and to gradually supply pressure to the actuator when the actuator is filled to prevent rapid clutch engagement which can cause premature clutch wear and hard shifts. In FIG. 1, the outlet 44 would be connected to the actuator.

In its initial position (FIG. 2), i.e. when no modulated pressure is present, the spring 72 will bias spool 50 upwardly toward stop 70 whereby land 58 will prevent flow from inlet 42 to outlet 44. The outlet 44 will be coupled to tank because a flow path is established between the conical surface 64 of portion 62 of spool 50 and the inner bore 83 of second sleeve 80. When it is desired to engage the clutch, modulated pressure will be provided by modulator 24 to chamber 36. When the pressure in chamber 36 exceeds the upward pressure of spring 72, the spool will gradually be urged downwardly, opposed initially only by spring forces. During such downward movement, conical surface 64 of portion 62 of sleeve 50 is gradually lowered toward the inner bore 53 of second sleeve 80. Further downward movement of the spool creates a gradually increasing leakage to the outlet 44, and when such leakage begins, movement of the spool 50 will be opposed by the combined forces of the spring 72 and the feedback pressure acting on the feedback area 84 of spool 50. As the reduced diameter portion 62 enters inner bore 83 (FIG. 3), the outlet to tank leakage is reduced. Accordingly, the leakage from inlet 42 to outlet 44 increases as the leakage from outlet 44 to tank 13 is reduced. The relative leakage from the inlet to the outlet 44 and tank 13 delivers its contract pressure.

While controlled pressure rise is one benefit of valve 10, another is the ability of valve 10 to maintain a predetermined controlled pressure on the engaged clutch. This is accomplished by providing the unique pressure feedback system built into valve 10. The valve is capable of matching the outlet pressure to the inlet pressure at full modulation, even though the recovery pressure of the modulator may be significantly less than the feedback pressure. This valve capability arises from the fact that an area differential is provided between that acted upon by the modulated pressure (the top of spool 50) and that area 84 acted upon by the feedback pressure. The pressure differential can be expressed by the following equation:

$$P_F = P_M \frac{A_M}{A_F}$$

where the feedback pressure is equal to the product of the modulated pressure and the ratio of the full spool area acted upon on the modulated side and the reduced differential spool area acted upon on the feedback side. The $A_F$ component will be selected for a particular application by adjustment of the diameter of the reduced diameter portion 62 of spool 50.

Valve 10 then accomplishes the aforementioned objects of the invention. A failsafe system is built into valve 10 by a single component, i.e. spring 72. In the event of a loss of pulse signals to the modulator, the outlet 44 will be connected directly to tank 13. Furthermore, because the feedback pressure acts directly on the differential area 84 within the outlet port chamber 44, a pressure passage to the end of the spool 50 is not required and separate lands employed in prior art devices to isolate feedback pressure from other pressures within the valve can be eliminated.

It will also be appreciated that because the reduced diameter portion 62 of spool 50 resides within the outlet port 44, the end of the spool can be connected directly to the tank. The conical surface 64 provides a metering means prior to a sliding seal being formed between the reduced diameter portion 62 and the inside bore 83 of the second sleeve 80.

While the present invention has been described by reference to a specific preferred embodiment, it is not to be limited thereby, but is to be limited solely by the claims which follow.

We claim:

1. A pressure reducing hydraulic control valve comprising:
   an elongate valve body having a spool receiving bore, said bore having a longitudinal axis and first and second ends;
   a hydraulic chamber at a first end of said bore;
   a fluid inlet to said bore for admitting hydraulic fluid under pressure thereto;
   a fluid outlet from said bore;
   a spool means slidably disposed within said bore, said spool including a first land adjacent said chamber, a second land located intermediate the ends of said spool means, said second land being constructed to selectively control the pressure within said outlet depending on the axial displacement of said spool means;
   means for selectively controlling the hydraulic pressure within said chamber and hence the hydraulic pressure acting upon the area of said first land exposed to said chamber;
   means for biasing said spool means toward said chamber whereby said second land prevents the passage of hydraulic fluid from said fluid inlet to said fluid outlet unless the pressure within said chamber exceeds a predetermined value;
   cylindrical sleeve means disposed within the second end of said bore, said second end of said bore communicating with tank;
   a reduced diameter portion of said spool means located at the end of said spool means remote from said first land and within said outlet, said portion having an outer surface adapted to form a sliding seal with the inner bore of said sleeve means when said spool is axially displaced toward said bore second end.

2. The valve of claim 1 wherein said biasing means comprises a spring means located intermediate the second end of said bore and said reduced diameter portion of said spool means.

3. The valve of claim 1 wherein said spool means includes an axial passage extending through its length, said passage being open to tank and communicating with said chamber through orifice means.

4. The valve of claim 1 wherein said controlling means comprises a hydraulic fluid modulator.

5. The valve of claim 4 wherein said hydraulic fluid modulator comprises a solenoid operated pulse modulator.

6. The valve of claim 1 wherein said reduced diameter portion includes an end having a surface shaped like a truncated cone, whereby said end acts to meter fluid flow from the outlet to the inner bore of said sleeve means as said spool is axially displaced toward said bore second end.

7. The valve of claim 1 wherein the source of fluid to said controlling means comprises a passageway coupling said fluid inlet to said controlling means.

8. The valve of claim 1 wherein an annular snap ring is provided in said chamber to limit movement of said spool into said chamber.

9. The valve of claim 1 wherein flow passage means is formed within said spool intermediate said first and second lands, at least a portion of said second land being located intermediate said fluid inlet and said fluid outlet when the fluid pressure within said chamber is below said predetermined valve.

10. A pressure relieving hydraulic control valve including pressure feedback, said valve being adapted for controlling the pressure of hydraulic fluid delivered to an outlet and for continually sensing the feedback pressure existing at said outlet, said valve comprising;
    an elongate, generally cylindrical bore in a valve sleeve, said bore having first and second ends;
    a hydraulic fluid chamber at the first end of said bore;
    modulator means for selectively increasing and decreasing the hydraulic fluid pressure within said chamber;
    a hydraulic fluid supply to said modulator means;
    a valve spool slidably disposed within said bore, said spool having first and second ends, the first end of said spool having an area equal to that of said bore;
    spaced apart inlet and outlet openings communicating with said bore and located intermediate the ends thereof;
    spring means within the second end of said bore biasing said spool toward said chamber;
    land means on said spool arranged to selectively permit hydraulic pressure in said outlet to be increased when said spool has moved axially in response to the pressure in said chamber exceeding the biasing force of said means;
    the second end of said spool being generally cylindrical and having a diameter less than that of said bore, the bottom edge of said second end having a conical bevel surface extending inwardly toward the axis of said bore; said second end being located within the outlet from said bore;
    cylindrical second sleeve means located within the second end of said bore, said second sleeve means having an inner bore, said second end of said spool being slidably receivable therein to form a sliding seal;
    feedback pressure from said outlet acting upon a smaller area of said spool within said outlet than the area of said spool acted upon by fluid pressure within said hydraulic fluid chamber;
    the second end of said bore being open to tank, whereby a fluid flow path is established between said outlet and tank unless said second end of said spool is slidingly received within the inner bore of said second sleeve means.

11. The invention set forth in claim 10 wherein said spool includes an axial passageway extending from the second end thereof toward the first end thereof, and wherein an orifice opening is provided between said passageway and said hydraulic fluid chamber.

* * * * *

UNITED STATES PATENT AND TRADEMARK OFFICE
CERTIFICATE OF CORRECTION

PATENT NO. : 4,576,200
DATED : March 18, 1986
INVENTOR(S) : Janecke, et al.

It is certified that error appears in the above-identified patent and that said Letters Patent is hereby corrected as shown below:

Column 2, Line 49, Delete "now abandoned by Dale A. Knutson"

and insert --now United States Patent No. 4,538,644 issued to Dale A. Knutson on September 3, 1985--

Signed and Sealed this

Fifth Day of August 1986

[SEAL]

Attest:

DONALD J. QUIGG

Attesting Officer

Commissioner of Patents and Trademarks